United States Patent
VonFelden et al.

(10) Patent No.: US 9,068,105 B2
(45) Date of Patent: Jun. 30, 2015

(54) HEAT-SEAL COATING

(71) Applicant: True Partners Financial Services, San Juan Capistrano, CA (US)

(72) Inventors: Robert VonFelden, Concord, CA (US); John Kokoszka, Atlanta, GA (US)

(73) Assignee: True Partners Financial Services, PLLC, San Juan Capistrano, CA (US)

(*) Notice: Subject to any disclaimer, the term of this patent is extended or adjusted under 35 U.S.C. 154(b) by 56 days.

(21) Appl. No.: 13/895,982

(22) Filed: May 16, 2013

(65) Prior Publication Data

US 2014/0039116 A1    Feb. 6, 2014

Related U.S. Application Data

(60) Provisional application No. 61/649,157, filed on May 18, 2012.

(51) Int. Cl.
     *C09K 3/10*      (2006.01)
     *C09J 123/08*      (2006.01)
     *C09J 167/02*      (2006.01)
     *C09J 167/08*      (2006.01)
     *C09J 7/02*      (2006.01)

(52) U.S. Cl.
     CPC ......... *C09K 3/1006* (2013.01); *C09J 123/0853* (2013.01); *C09J 167/02* (2013.01); *C09J 167/08* (2013.01); *C09J 7/0203* (2013.01)

(58) Field of Classification Search
     USPC .......................................................... 524/513
     See application file for complete search history.

(56) References Cited

U.S. PATENT DOCUMENTS

| | | | | |
|---|---|---|---|---|
| 3,586,737 A | * | 6/1971 | Duke | 525/310 |
| 3,622,439 A | * | 11/1971 | Manne et al. | 428/414 |
| 5,858,551 A | | 1/1999 | Salsman | |
| 7,087,695 B2 | * | 8/2006 | Koyama | 526/318 |

FOREIGN PATENT DOCUMENTS

WO      WO 9951430 A1 *    10/1999

* cited by examiner

Primary Examiner — Satya Sastri
(74) Attorney, Agent, or Firm — Miller Law Group, PLLC

(57) ABSTRACT

Described herein is a heat-seal coating which, when going through the recycled paper making process, will readily break down without any major amount of by-product that needs to be landfilled; can be made into paper again; breaks down in a commercial composting facility; and decomposes into basic materials such as carbon dioxide, carbon monoxide and water. The heat seal coating or top coat comprises three components: (1) a barrier polymer; (2) a polymer that provides some barrier properties and softness to the formulation; and, (3) a heat-curable adhesive.

4 Claims, No Drawings

HEAT-SEAL COATING

PRIOR APPLICATION INFORMATION

The instant application claims the benefit of U.S. Provisional Patent Application 61/649,157, filed May 18, 2012, the content of which is incorporated herein by reference.

BACKGROUND OF THE INVENTION

"Lamination" is the act of applying multiple layers of film to each other or to another substrate such as paper. This laminated structure can be produced with adhesives or by using a thermoplastic film that will adhere to itself and/or the paper substrate under hot conditions and pressure. Laminated films or structures will typically give good barrier properties preventing odor, grease, oil, moisture vapor and/or water-based materials from leaking through the laminated structure. In some instances, a specific form such as a drink cup or ice cream container will be formed so as to provide a vessel which will hold quantities of liquids. In these instances, the thermoplastic film will provide heat-sealing capability. In other words, the thermoplastic film under heat and pressure will now adhere to itself when formed into a cup or container.

The polymer typically used for heat-seal applications is polyethylene (PE). This coating is based on petroleum (i.e., ethylene) which is polymerized into a high molecular weight polymer. This can be extruded or laminated onto paper or board that is used in food and other packaging. For example, PE is used for most inner layers of packing materials. PE provides very good barrier properties (i.e., resistance to water, grease, oil and moisture vapor) and since it is thermoplastic at a low enough temperature, it can be heat-sealed to itself, providing a way to make the package without an additional adhesive being used. To achieve these properties, PE has to be properly applied and sufficiently thick.

Paper laminated or extrusion coated with PE will not decompose or biodegrade in landfill because of the PE. While it can be repulped and recycled, the fiber yield is low because the PE is bound so tightly to the paper substrate. When repulped, the PE with a fiber layer on it has to be taken from the repulper and sent to landfill. Most major retailers would like to stop using PE, but there is currently no suitable alternative.

A suitable heat-seal coating should be repulpable (when going through the recycled paper making process, will readily breakdown without any major amount of by-product that needs to be landfilled), recyclable (can be made into paper again), compostable (break down in a commercial composting facility) and biodegradable (decomposes into basic materials such as carbon dioxide, carbon monoxide and water).

Repulpability refers to the ability of paper packaging to be broken down when it is recycled at a paper mill. One common standard is that 80% of the fiber in the packaging has to be available for the recycled board during the repulping process for paper packaging to be considered repulpable.

Recyclability refers to the fiber from the repulping process being incorporated into paper sheet. For example, when 20% of the recovered fiber is combined with 80% virgin fiber, the resulting paper must have the same physical properties as a similar sheet made from 100% virgin fiber.

Biodegradability and compostability refer to products which are compostable in municipal and industrial composting facilities. Furthermore, the degradation of the specific materials must not diminish the value or utility of the compost resulting from the composting process.

SUMMARY OF THE INVENTION

According to a first aspect of the invention, there is provided a coating comprising: a barrier polymer, a soft polymer and an adhesive.

The coating may comprise 2-8 parts barrier polymer 2-8 parts soft polymer and 1 part adhesive.

The barrier polymer may be a stearic acid modified polyethylene terephthalate.

The soft polymer may be a tall oil modified PET.

The adhesive may be a vinyl acetate/ethylene copolymer.

DESCRIPTION OF THE PREFERRED EMBODIMENTS

Unless defined otherwise, all technical and scientific terms used herein have the same meaning as commonly understood by one of ordinary skill in the art to which the invention belongs. Although many methods and materials similar or equivalent to those described herein can be used in the practice or testing of the present invention, the preferred methods and materials are now described. All publications mentioned hereunder are incorporated herein by reference.

Described herein is a heat-seal coating which, when going through the recycled paper making process, will readily break down without any major amount of by-product that needs to be landfilled; can be made into paper again; breaks down in a commercial composting facility; and decomposes into basic materials such as carbon dioxide, carbon monoxide and water.

The heat seal coating or top coat comprises three components: (1) a barrier polymer; (2) a polymer that provides some barrier properties and softness to the formulation; and, (3) a heat-curable adhesive.

As will be appreciated by one of skill in the art, softness refers to the glass transition temperature of the polymer, which is the point at which the polymer transitions from a rubbery, viscous solution to a brittle, glassy amorphous solid.

As discussed herein, the coating is recoatable, which is an important feature for at least two reasons: (1) if during manufacturing the proper amount of coating is not laid down the first time, more coating can be added; (2) by virtue of being recoatable, products coated with the coating are also easier to print on and to glue to.

The barrier polymer (in some embodiments, 25% solids as supplied) is a modified polyester terephthalate (PET) that is made using recycled PET. Like PE, it is based on petroleum feedstock but because it uses recycled PET, it is better received by consumers and purchasers than material made from virgin raw material sources. As discussed below, long-chain fatty acids are incorporated into the barrier polymer. Typically, these fatty acids would be plant based such as stearic acid which contains various amounts of $C_{18}$, $C_{20}$, and the like.

The soft polymer (in some embodiments, 30% solids as supplied) is also a modified PET made from recycled PET. The soft polymer comprises a tall oil fatty acid component within the polyester backbone. The polymer made from this combination is softer in nature, and is not as good a water repellent product. However, when mixed with the barrier polymer, it provides good barrier properties and a mixed polymer that is easier to heat-seal with the third component of the formulation. When used in sufficient amounts it also allows the mixture to be recoatable, which the barrier polymer by itself cannot do.

Thus, the barrier polymer comprises PET modified with stearic acid while the soft polymer comprises PET modified with tall oil.

Polyethylene terephthalate (PET) is used in most plastic beverage bottles. The barrier polymer is a modified PET that it is dispersible in water so that it can be applied using conventional coating equipment as discussed herein. A method for preparing such a water-dispersible PET is described in U.S. Pat. No. 5,858,551 which is incorporated herein by reference in its entirety, particularly the sections describing the preparation of the water-dispersible PET. The modifications also affect the polymer properties such that it can be repulped when applied to paper packaging.

As discussed in U.S. Pat. No. 5,858,551, the carboxy functional compound preferably has at least two carboxyl groups. In preferred embodiments, the carboxy functional compound is selected from the group consisting of trimellitic acid, trimellitic anhydride, maleic acid, maleic anhydride, fumaric acid and isophthalic acid.

As noted above, this modified PET is a PET-containing polymer that has been chemically modified with the addition of carboxyl functional fatty acids. Specifically, the modified PET is a water dispersible and redispersible hydrophobic polyester resin derived from PET or recycled PET and has improved hydrophobicity and/or non-polar characteristics, as described in U.S. Pat. No. 5,858,551. As discussed therein, the polyester resins have a general formula of: $I_n$-P-$A_m$ wherein I is the ionic group, n is an integer of 1-3, P is a polyester backbone, A is an aliphatic group and m is an integer of 3-8. PET content can vary from 30-80% though 40-60%, 50-60% or 40-50% is preferred. Due to the carboxyl functionality on the modified PET, the modified PET is self-emulsifying when it is mixed with water that contains a base. Various bases can be used, but ammonia is preferred because it is fugitive; i.e., when the coating is heated, the ammonia vaporizes leaving a durable surface that is not easily adhered to by adhesives.

Because these resins contain a high concentration of hydrophobic groups and have much improved ability to orient those hydrophobic groups away from the paper or paperboard, the surface of paper or paperboard coated has significant water-repelling properties. Consequently these coatings can effectively make paper or paperboard surface waterproof or water repellant.

The heat-curable adhesive (in some embodiments, 50% solids as supplied) or heat activated adhesive is an acrylic-based polymer, as discussed below. In some embodiments, other suitable adhesives are used provided they are heat-curable.

The heat activated adhesive is primarily designed to bond PET to PET as well as various other plastics, clay coated paper boards and metals. In some embodiments, the adhesive is 40-50% vinyl acetate/ethylene copolymer, 40-50% water, 9-12% modified polyhydroxyether, 0.1-0.5% butanol and 0.3-1.0% propylene glycol n-propyl ether.

As will be appreciated by one of skill in the art, the barrier polymer softens at temperatures that are higher than those normally used in the PE heat-sealing processes. In order to overcome this, the soft polymer (i.e., needs less heat to soften) and curable adhesive are added. As a result of being present in a mixture, in many embodiments of the invention, the total combination will stay together when heat-sealed at PE heat-sealing temperatures or below, as discussed herein.

Specifically, typical dwell times for heat sealing PE are based upon the thickness of the PE layer on either side of the paper board substrate being used as well as the basis weight or thickness of the paper being used. The typical dwell time is 0.15 to 0.30 of a second. The typical temperature applied to targeted pattern points prior to pressure being applied to these pattern points for example the side seam, lower exterior bottom pre-curl and inside underneath bottom rollover of the bottom disc flange ranges from 900-975 F or 1050-1100 F for PE coatings.

In contrast, the instant coatings require less "weight" compared to corresponding PE applications, which means that less heat is required. For example, in some embodiments of the invention, a temperature as low as 800-950 F can be used with sealing being achieved in 0.15 to 0.21 of a second. As will be appreciated by one of skill in the art, these values depend on the application. In other embodiments, lower temperatures may be used as may higher temperatures, in some cases with shorter dwell times, thereby allowing faster processing of the product.

It is of note that the coatings using the formulation described herein may also be considered to be "thinner" rather than as having less weight. As will be apparent to one of skill in the art, the PET barrier polymer is able to bond with the soft polymer and the adhesive in a highly efficient manner meaning that less coating is required.

As will be appreciated by one of skill in the art, one key consideration in selecting a substrate for heat sealing is the stability of the substrate under heat sealing conditions. The fact that lower temperatures can be used in combination with the instant coatings means that additional substrates unsuitable for PE heat seals may be suitable for use with the coatings described herein.

As will be appreciated by one of skill in the art, some coated products require only short term barrier properties, such as containers associated with fast food, some snacks and drinks, whereas other containers are intended for longer term storage, for example, shipping containers, storage containers, pet food containers and other industrial applications. In some embodiments, the container is a drink cup or an ice cream container, as discussed herein. Other examples include but are by no means limited to butter boxes, frozen food containers, soap bar boxes, bakery packaging, confection packaging, and as a replacement for waxed frozen vegetable packs.

Furthermore, it is important to note that the selection of a particular coating is often a balancing act, as increasing certain properties can have a detrimental effect on other properties. For example, greater heat sealability tends to result in more blocking or sticking together during the manufacturing process; selecting a coating with higher water retention tends to result in poorer water barrier effectiveness; selecting a coating with higher water barrier tends to result in poorer cold glueability; higher oil resistance tends to result in poorer hot melt adhesion; and in general, and most significantly, selecting a coating with the highest effectiveness tends to result in higher costs.

According to a first aspect of the invention, there is provided a coating comprising: a barrier polymer, a soft polymer and an adhesive.

The coating may comprise 2-8 parts barrier polymer 2-8 parts soft polymer and 1 part adhesive.

The barrier polymer may be a stearic acid modified polyethylene terephthalate.

The soft polymer may be a tall oil modified PET.

The adhesive may be a vinyl acetate/ethylene copolymer.

For application to a desired paper or paperboard substrate, the coating may comprise 2-8 parts barrier polymer (stearic acid modified PET), 2-8 parts soft polymer (tall oil modified PET) and 1 part adhesive (vinyl acetate/ethylene copolymer).

In a preferred embodiment, the formulation is 4 parts Barrier Polymer, 4 parts Soft Polymer and 1 part Adhesive based on the material as supplied.

In alternative embodiments, depending on the desired properties or desired performance, the coating may comprise for example 2 parts barrier polymer and 6 parts soft polymer per one part adhesive; 3 parts barrier polymer and 5 parts soft polymer per one part adhesive; 5 parts barrier polymer and 3 parts soft polymer per one part adhesive; 6 parts barrier polymer and 2 parts soft polymer per one part adhesive; 2 parts barrier polymer and 8 parts soft polymer per one part adhesive; 3 parts barrier polymer and 7 parts soft polymer per one part adhesive; 4 parts battier polymer and 6 parts soft polymer per one part adhesive; 5 parts barrier polymer and 5 parts soft polymer per one part adhesive; 6 parts barrier polymer and 4 parts soft polymer per one part adhesive; 7 parts barrier polymer and 3 parts soft polymer per one part adhesive; or 8 parts battier polymer and 2 parts soft polymer per one part adhesive.

Thus, the ratio of polymer:adhesive is from 8:1 to 10:1. Each polymer may be present at 2-8 parts per 1 part adhesive. That is, the total amount of polymer to adhesive is between 8:1 and 10:1 with each respective polymer being present in the formulation at 2-8 parts per 1 part adhesive.

As discussed below, at lower ratios of polymer:adhesive, there is sufficient adhesive present that the adhesive can form a film during recycling or repulping process. At higher ratios, such as those disclosed above, the adhesive does not form a film but rather forms discreet particles which decay or dissolve. Furthermore, at higher ratios of polymer to adhesive, for example, above 10:1, the heat sealing may not necessarily be complete under PE heat sealing conditions, as discussed below.

It is important to note that as used herein the term "part" does not necessarily mean an exactly equivalent amount but may in fact mean for example "about 4 parts barrier polymer and about 4 parts soft polymer".

As will be readily apparent to one of skill in the art, many factors must be considered when determining what ratio of components is to be applied to a particular product and to what weight. These include but are by no means limited to the substrate to be coated, the desired coating weight, desired run speed of the coater and the converting operation and desired performance properties. It is respectfully noted that such fine-tuning of variables are well within the scope of routine experimentation by one of skill in the art.

In a preferred embodiment, the coating comprises 4 parts barrier polymer, 4 parts soft polymer and 1 part adhesive. As discussed herein, in testing, this coating has demonstrated a good bond on the sidewalls, the top rim and the bottom of the container.

As will be apparent to one of skill in the art, the adhesive on its own is not biodegradable or compostable. However, it is believed that the adhesive is present in a sufficiently low amount that it will be "diluted" by the PET polymers which are repulpable, and recyclable, as discussed above. Consequently, during recycling and/or repulping, the adhesive won't come off as a film, but as discreet particles that will be retained by the fibers. In the composting process, the discreet particles will eventually decompose while a film would not. Specifically, if a vinyl acetate/ethylene copolymer adhesive or similar adhesive is the principal ingredient in the formulation, the decomposition process is so slow that it does not go completely away in the 90-180 days that are allowed for composting.

As discussed above, ratios of less than 8:1 work fine, but are more costly and less environmentally acceptable due to the tendency of the adhesive to form a film. At higher ratios, for example, above 10 parts total polymer to 1 part adhesive, the heat-seal properties are marginal, especially on heavier paper. Specifically, the heat sealing is not complete at the side seams, lip and/or bottom of the container.

As discussed above, if only the barrier polymer is used, heat-sealing would occur but higher levels of coating would be needed and/or hotter temperatures with longer dwell times would also be needed. While this alone would not eliminate current substrates, these conditions would be outside of the economical run speeds of the current high speed equipment. It is also anticipated that there would be a higher level of failures, for example, more leaking cups, because of poor heat sealing.

Alternatively, if only the soft polymer is used in the coating, good heat-seal properties may be achieved, but the barrier properties (i.e., resistance to water) would not be optimum. Furthermore, the softness of the polymer may lead to some processing problems during the coating process (i.e., when the coating is applied to the paper on the coater). For example, there may be a greater tendency for the coating to block (i.e., stick to itself when rolled up at the end of the coating process). There could also be sticking on the metal parts of the cup forming machine. There is a chance that the cups for liquids might not stand up to the liquids as well because they would not be as resistant to the moisture.

While not wishing to be bound by a particular theory or hypothesis, it is believed that because of the amount of the soft polymer in the formulation, the resulting coating combination is much less water repellant and therefore is easier to recoat. This is because the tall oil fatty acids in the soft polymer are not as waxy as the stearic acid blends in barrier polymer, making them less water repellant.

Thus, as described herein, the specific properties of the coatings can be designed or modified to have specific desirable properties, for example, water vapor transmission rate, Cobb values, oil and grease resistance, freeze and release, heat seal temperatures and dwell times, to function with the chosen caliper of paperboard, desired line speed and heat and pressure conditions for specific equipment or applications. As discussed above, a thinner coating can be used compared to PE coatings and unlike PE coatings, substrates coating with these coatings are recyclable and repulpable.

In one embodiment, the coating is made by mixing the two PET polymer dispersions in the desired ratio. When uniform, the adhesive is added to the PET mixture with agitation. When uniform, this mixture can then be used for coating.

As will be apparent to one of skill in the art, a number of different mixing methods may be used to produce a uniform coating solution suitable for application to the desired substrate.

First the desired substrate is determined; to this is applied a basecoat to seal the sheet so that the minimum amount of topcoat can be used. One skilled in the art realizes that different basis weights of paper or board will be used for the sidewalls and bottoms of the cups. Any standard basecoat can be used as long as it does not negatively impact the environmental properties of repulpability, recyclability, biodegradability and/or compostability. Such suitable basecoats are well known in the art. The base coated substrate is then coated using conventional methods with the prepared heat-sealable top coat.

In one embodiment, a drawdown bar is used which will apply a prescribed amount of coating. This is then dried/cured at 225 F; this sets the coatings but does not activate the adhesive which is activated at 300-325 F. As a result, the adhesive is available to be activated later in the process, when the coated substrate is being formed into the desired product, for example, a cup or container.

In commercial applications, the polymers are mixed as above and then applied on commercial coating equipment. Paper prepared in this manner is cut into proper blank sizes and then processed on equipment where the heatsealing properties are utilized.

It is of note that the coatings as described herein can be applied using any suitable means known in the art. For example, a blade coater, rod coater or air knife coater may be used or the coating may be spray coated or applied with a metered size press.

In some embodiments, the equipment is a cup forming machine. In these embodiments, the various components of a cup (bottom disc, sidewall and lids) are assembled at a high rate of speed (150-300 cups per min.) using heat and pressure during this process. Typical substrates used for cup forming are cup board or Solid Bleached Sulphate. They have high moisture resistance and sizing is added to it for non-wicking performance. Depending on how large or small the cup will dictate what caliper will be used for the side wall and bottoms (12 pt-24 pt). In general, the bigger the cup, the higher caliper (thickness) of the basestock used. The cup former uses vacuum grips to pull the sidewalls of the cup to position them over a heated platen (which heats the coating) and are then wrapped around a mandrel where the side seams are then pressed together from the heated platen and a pressurized side seam bar that generates pressure (135 psi is generally used) to seal the heated coating for the side seams. As these sidewalls are moved along, they are now ready to receive the bottom disc. The formed side walls are moved into another station of the former where they are positioned over another mandrel that pushes the bottom disc into place then applies heat and pressure once again to wrap the sidewalls onto and over the bottom disc to achieve a tight bond. The process all takes place within about 0.15 to 0.21 of a second. Typical running speeds and temperature will vary based on the cup size and substrate being used in the forming process. The above-described coating formulation has an optimum temp on the PMC 1000 of between 800-950 F and creates a sure bond between the side walls and bottom discs.

The invention will now be further illustrated by way of example(s). The invention however is not necessarily limited by the example(s).

EXAMPLE 2,222 lbs of the barrier polymer is mixed with 2,222 lbs of the soft polymer; to this is mixed 556 lbs of the heat-activated adhesive. This mixture is applied to the wire side of 18 pt SBS board on a commercial metered size press coater. The coating is dried and cured using infra-red and forced air heat. The exit temperature from the oven may be 220 F or 170-180 F. The coated board is slit into 12 inch widths. Subsequently 14 pt SBS board is coated with the same solution on the screen side of the board. Following the same procedure the coating is dried and cured and then slit into approximately 4¾ inch wide strips. The two boards are sent to a converter who uses the 18 pt board to make the sidewalls and the 14 pt board to make the bottoms of an ice cream container. The ice cream container is sent to a dairy who will load it with liquid or soft-serve ice cream and then flash-freeze the container. This frozen package will then be sent to a grocery store for sale to a consumer.

While the preferred embodiments of the invention have been described above, it will be recognized and understood that various modifications may be made therein, and the appended claims are intended to cover all such modifications which may fall within the spirit and scope of the invention.

The invention claimed is:

1. A coating comprising: stearic acid modified polyethylene terephthalate, tall oil modified polyethylene terephthalate and an adhesive.

2. The coating according to claim 1 wherein the coating comprises 2-8 parts stearic acid modified polyethylene terephthalate (wt.), 2-8 parts tall oil modified polyethylene terephthalate (wt.) and 1 part adhesive (wt.).

3. The coating according to claim 1 wherein the adhesive is a vinyl acetate/ethylene copolymer.

4. The coating according to claim 2 wherein the adhesive is a vinyl acetate/ethylene copolymer.

* * * * *